US005129303A

United States Patent [19]

Coles

[11] Patent Number: 5,129,303

[45] Date of Patent: Jul. 14, 1992

[54] MUSICAL EQUIPMENT ENABLING A FIXED SELECTION OF DIGITALS TO SOUND DIFFERENT MUSICAL SCALES

[76] Inventor: Donald K. Coles, 2505 Capitol Ave., Fort Wayne, Ind. 46806

[21] Appl. No.: 749,895

[22] Filed: Aug. 26, 1991

Related U.S. Application Data

[63] Continuation-in-part of Ser. No. 362,826, Jun. 7, 1989, abandoned, which is a continuation-in-part of Ser. No. 255,751, Oct. 11, 1988, Pat. No. 4,903,572, which is a continuation-in-part of Ser. No. 15,718, Feb. 17, 1987, abandoned, which is a continuation-in-part of Ser. No. 921,407, Oct. 22, 1986, Pat. No. 4,750,399, which is a continuation-in-part of Ser. No. 736,701, May 22, 1985, Pat. No. 4,640,173.

[51] Int. Cl.[5] .......... G01G 7/00; G10H 1/20

[52] U.S. Cl. .......... 84/685; 84/442; 84/451

[58] Field of Search .......... 84/428, 423 R, 423 A, 84/442, 445, 451, 453, 473, 474, 478, DIG. 23, 619, 657, 685

[56] References Cited

U.S. PATENT DOCUMENTS

| | | | |
|---|---|---|---|
| 2,484,930 | 10/1949 | Cornelius | 84/1.01 |
| 3,986,422 | 10/1976 | Coles | 84/1.01 |
| 4,009,633 | 3/1977 | Coles | 84/1.01 |
| 4,640,173 | 2/1987 | Coles | 84/1.01 |
| 4,674,383 | 6/1987 | Suzuki | 84/1.03 |
| 4,750,399 | 6/1988 | Coles | 84/478 |
| 4,777,857 | 10/1988 | Stewart | 84/1.01 |
| 4,821,619 | 4/1989 | Coles | 84/448 |
| 4,903,572 | 2/1990 | Coles | 84/442 |
| 4,905,561 | 3/1990 | Mizuno | 84/613 |
| 4,939,974 | 7/1990 | Ishida et al. | 84/609 |

*Primary Examiner*—Stanley J. Witkowski

[57] ABSTRACT

Musical equipment enables the row of front digitals of a musical keyboard to sound either the diatonic scale or a six-tone musical scale. Thus music written by different methods of notation can be played on the keyboard by a musician trained in either one of the methods. Musical notation based on a six-tone musical scale can depict intimately the consonant sounds of music, and it can have a system of key signatures that is much easier to learn and to use than the traditional system of key signatures. When a keyboard digital is played, a digital identifying number for that keyboard digital is transmitted in binary code for a separate sound generator. Translating apparatus intercepts this transmission and transforms the digital numbers into associated pitch numbers in such a way that the front digitals of the keyboard can play either the diatonic scale or a six-tone scale, and can play either scale in any musical key with its key signature automatically actuated. When the front digitals of the keyboard are playing a selected musical scale, the back digitals can play the remaining tones of the twelve tone scale.

7 Claims, 10 Drawing Sheets

FIG. 20

FIG. 3 TONIC AND CHROMATIC HEXACHORDS

| | | |
|---|---|---|
| TONAL HEXACHORD MAJOR MODE | C D E F G A | 2-2-1-2-2-3 |
| TONAL HEXACHORD MINOR MODE | D E F G A C | 2-1-2-2-3-1 |
| CHROMATIC HEXACHORD | F# G# A# Cb Db Eb | 2-2-1-2-2-3 |

FIG. 7 Ar – ri – ve-der-ci, Ro-ma. Good-by, good-by to Rome.

FIG. 8 THE TWELVE TONE SCALE

| | | | | | | | | | | | | |
|---|---|---|---|---|---|---|---|---|---|---|---|---|
| TRADITIONAL SYMBOLS | C | Db | D | Eb | E | F | F# | G | G# | A | A# | Cb |
| WHOLE TONE SYMBOLS | C | Db | D | Eb | E | Xb | X | Yb | Y | Zb | Z | Cb |

FIG. 9 THE TRADITIONAL KEY SIGNATURES

| BASIC DIATONIC NOTES | F = KEY SIG. FLATS 7 | 6 | 5 | 4 | 3 | 2 | 1 | 0 | S = KEY SIG. SHARPS 1 | 2 | 3 | 4 | 5 | 6 | 7 |
|---|---|---|---|---|---|---|---|---|---|---|---|---|---|---|---|
| B | B♭ | B♭ | B♭ | B♭ | B♭ | B♭ | B♭ | B | B | B | B | B | B | B | B♯ |
| A | A♭ | A♭ | A♭ | A♭ | A♭ | A | A | A | A | A | A | A | A♯ | A♯ | A♯ |
| G | G♭ | G♭ | G♭ | G | G | G | G | G | G | G | G♯ | G♯ | G♯ | G♯ | G♯ |
| F | F♭ | F | F | F | F | F | F | F | F♯ | F♯ | F♯ | F♯ | F♯ | F♯ | F♯ |
| E | E♭ | E♭ | E♭ | E♭ | E♭ | E♭ | E | E | E | E | E | E | E | E♯ | E♯ |
| D | D♭ | D♭ | D♭ | D♭ | D | D | D | D | D | D | D | D♯ | D♯ | D♯ | D♯ |
| C | C♭ | C♭ | C | C | C | C | C | C | C | C♯ | C♯ | C♯ | C♯ | C♯ | C♯ |
| | C♭ | G♭ | D♭ | A♭ | E♭ | B♭ | F | C | G | D | A | E | B | F♯ | C♯ |

FIG. 10 HEXACHORD KEY SIGNATURES

| BASIC WHOLE TONE SCALE NOTES | FLATS K = HEXATONIC KEY PARAMETER 0 | 2 | 4 | 6 | 8 | 10 | SHARPS 0 | 2 | 4 | 6 | 8 | 10 |
|---|---|---|---|---|---|---|---|---|---|---|---|---|
| Z | Z♭ | Z♭ | Z♭ | Z | Z | Z | Z | Z | Z | Z♯ | Z♯ | Z♯ |
| Y | Y♭ | Y♭ | Y | Y | Y | Y♭ | Y | Y | Y♯ | Y♯ | Y♯ | Y |
| X | X♭ | X | X | X | X♭ | X♭ | X | X♯ | X♯ | X♯ | X | X |
| E | E | E | E | E♭ | E♭ | E♭ | E♯ | E♯ | E♯ | E | E | E |
| D | D | D | D♭ | D♭ | D♭ | D | D♯ | D♯ | D | D | D | D♯ |
| C | C | C♭ | C♭ | C♭ | C | C | C♯ | C | C | C | C♯ | C♯ |
| | C | D | E | X | Y | Z | C♯ | D♯ | E♯ | X♯ | Y♯ | Z♯ |

FIG. 11 HEXACHORD KEY SIGNATURES (FLATS)

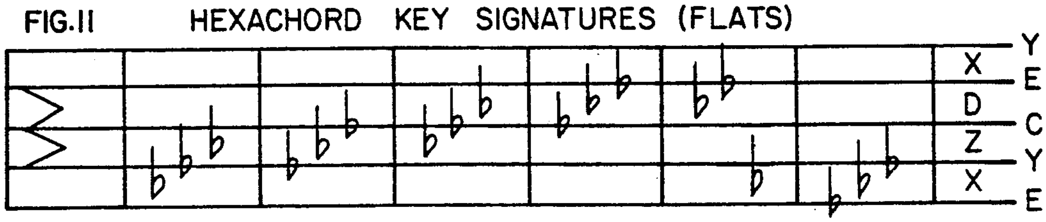

K ⟶ 0 2 4 6 8 10
KEY OF C D E X Y Z

FIG. 12 HEXACHORD KEY SIGNATURES (SHARPS)
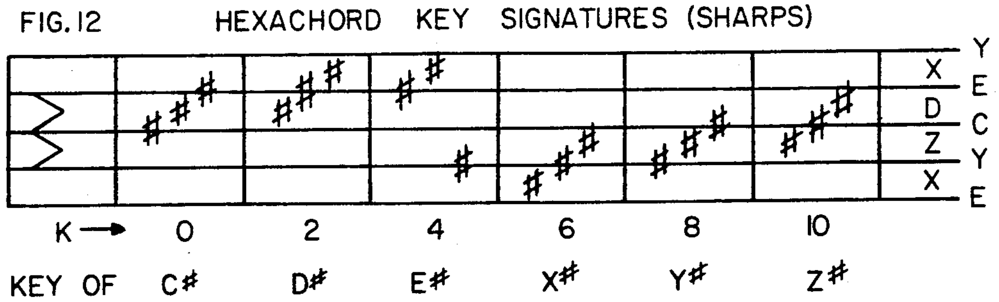
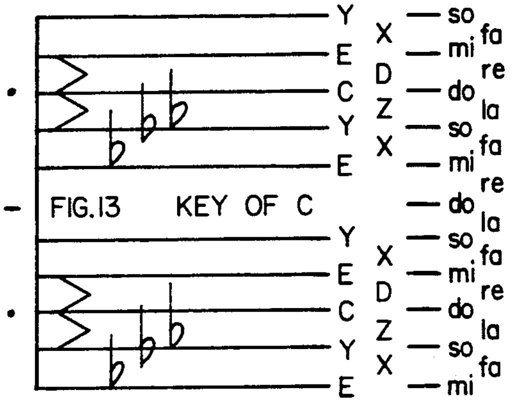
FIG. 13 KEY OF C
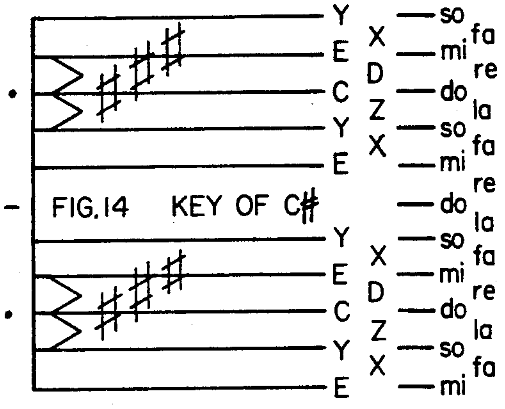
FIG. 14 KEY OF C#
FIG. 15
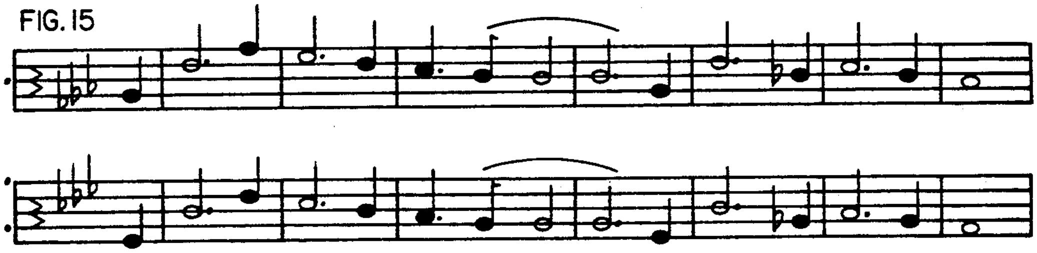
FIG. 16
FIG. 17 Ar — ri — ve der — ci, Ro ma. Good — by, good — by to Rome.
FIG. 18
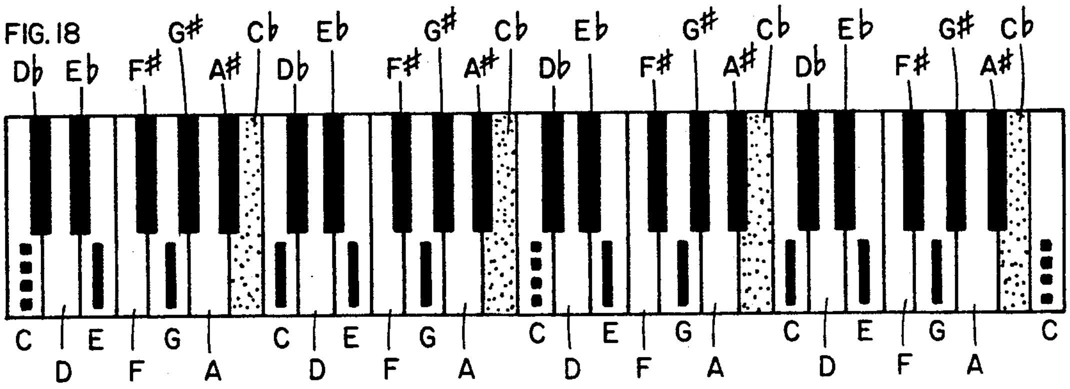

FIG. 21 MIDI PITCH NUMBERS P
| OCTAVE | C | D♭ | D | E♭ | E | X♭ | X | Y♭ | Y | Z♭ | Z | C♭ |
|---|---|---|---|---|---|---|---|---|---|---|---|---|
| 6 | 96 | 97 | 98 | 99 | 100 | 101 | 102 | 103 | 104 | 105 | 106 | 107 |
| 5 | 84 | 85 | 86 | 87 | 88 | 89 | 90 | 91 | 92 | 93 | 94 | 95 |
| 4 | 72 | 73 | 74 | 75 | 76 | 77 | 78 | 79 | 80 | 81 | 82 | 83 |
| 3 | 60 | 61 | 62 | 63 | 64 | 65 | 66 | 67 | 68 | 69 | 70 | 71 |
| 2 | 48 | 49 | 50 | 51 | 52 | 53 | 54 | 55 | 56 | 57 | 58 | 59 |
| 1 | 36 | 37 | 38 | 39 | 40 | 41 | 42 | 43 | 44 | 45 | 46 | 47 |
| 0 | 24 | 25 | 26 | 27 | 28 | 29 | 30 | 31 | 32 | 33 | 34 | 35 |
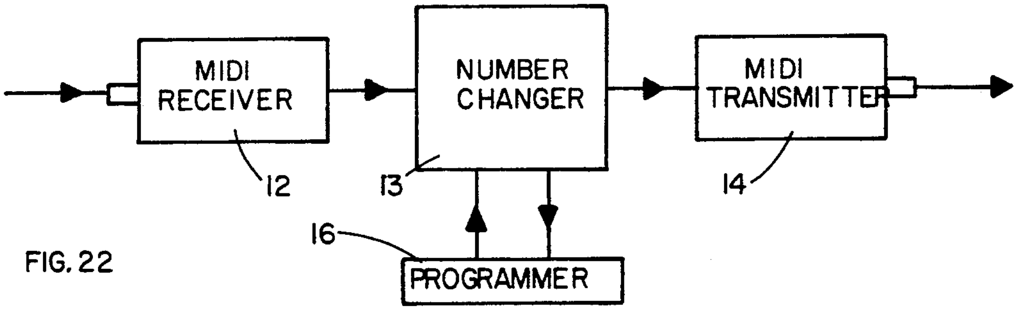
FIG. 22
FIG. 23
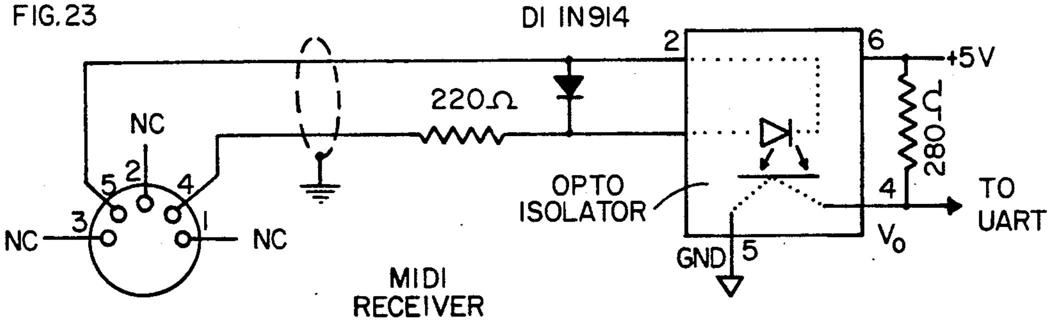
FIG. 24
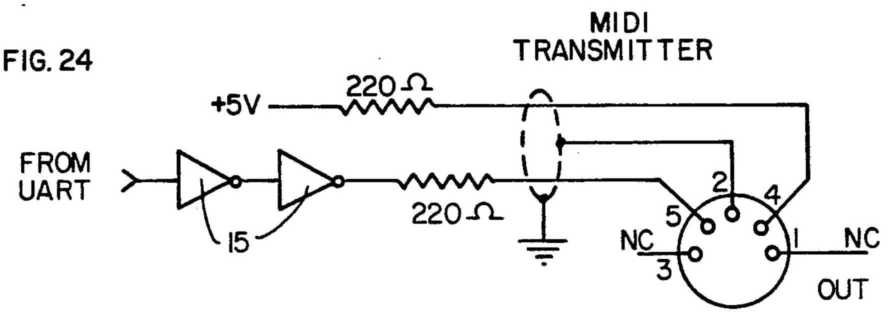

FIG. 25 HEXACHORD PITCH NUMBERS FLATS

| FRONT DIGITAL NOS. D | $R_0$ | K = HEXATONIC KEY PARAMETER 0 | 2 | 4 | 6 | 8 | 10 |
|---|---|---|---|---|---|---|---|
| 84 | 0 | 84 | 83 | 83 | 83 | 84 | 84 |
| 82 | 10 | 81 | 81 | 81 | 82 | 82 | 82 |
| 80 | 8 | 79 | 79 | 80 | 80 | 80 | 79 |
| 78 | 6 | 77 | 78 | 78 | 78 | 77 | 77 |
| 76 | 4 | 76 | 76 | 76 | 75 | 75 | 75 |
| 74 | 2 | 74 | 74 | 73 | 73 | 73 | 74 |
| 72 | 0 | 72 | 71 | 71 | 71 | 72 | 72 |
| 70 | 10 | 69 | 69 | 69 | 70 | 70 | 70 |
| 68 | 8 | 67 | 67 | 68 | 68 | 68 | 67 |
| 66 | 6 | 65 | 66 | 66 | 66 | 65 | 65 |
| 64 | 4 | 64 | 64 | 64 | 63 | 63 | 63 |
| 62 | 2 | 62 | 62 | 61 | 61 | 61 | 62 |
| 60 | 0 | 60 | 59 | 59 | 59 | 60 | 60 |
| 58 | 10 | 57 | 57 | 57 | 58 | 58 | 58 |
| 56 | 8 | 55 | 55 | 56 | 56 | 56 | 55 |

FIG. 26 HEXACHORD PITCH NUMBERS SHARPS

| FRONT DIGITAL NOS. D | $R_0$ | K = HEXATONIC KEY PARAMETER 0 | 2 | 4 | 6 | 8 | 10 |
|---|---|---|---|---|---|---|---|
| 84 | 0 | 85 | 84 | 84 | 84 | 85 | 85 |
| 82 | 10 | 82 | 82 | 82 | 83 | 83 | 83 |
| 80 | 8 | 80 | 80 | 81 | 81 | 81 | 80 |
| 78 | 6 | 78 | 79 | 79 | 79 | 78 | 78 |
| 76 | 4 | 77 | 77 | 77 | 76 | 76 | 76 |
| 74 | 2 | 75 | 75 | 74 | 74 | 74 | 75 |
| 72 | 0 | 73 | 72 | 72 | 72 | 73 | 73 |
| 70 | 10 | 70 | 70 | 70 | 71 | 71 | 71 |
| 68 | 8 | 68 | 68 | 69 | 69 | 69 | 68 |
| 66 | 6 | 66 | 67 | 67 | 67 | 66 | 66 |
| 64 | 4 | 65 | 65 | 65 | 64 | 64 | 64 |
| 62 | 2 | 63 | 63 | 62 | 62 | 62 | 63 |
| 60 | 0 | 61 | 60 | 60 | 60 | 61 | 61 |
| 58 | 10 | 58 | 58 | 58 | 59 | 59 | 59 |
| 56 | 8 | 56 | 56 | 57 | 57 | 57 | 56 |

FIG. 27 HEXACHORD PITCH NUMBERS FLATS

| BACK DIGITAL NOS. | | K = HEXATONIC KEY PARAMETER | | | | | |
|---|---|---|---|---|---|---|---|
| D | $R_0$ | 0 | 2 | 4 | 6 | 8 | 10 |
| 79 | 2 | 80 | 80 | 79 | 79 | 79 | 80 |
| 77 | 0 | 78 | 77 | 77 | 77 | 78 | 78 |
| 75 | 10 | 75 | 75 | 75 | 76 | 76 | 76 |
| 73 | 8 | 73 | 73 | 74 | 74 | 74 | 73 |
| 71 | 6 | 71 | 72 | 72 | 72 | 71 | 71 |
| 69 | 4 | 70 | 70 | 70 | 69 | 69 | 69 |
| 67 | 2 | 68 | 68 | 67 | 67 | 67 | 68 |
| 65 | 0 | 66 | 65 | 65 | 65 | 66 | 66 |
| 63 | 10 | 63 | 63 | 63 | 64 | 64 | 64 |
| 61 | 8 | 61 | 61 | 62 | 62 | 62 | 61 |
| 59 | 6 | 59 | 60 | 60 | 60 | 59 | 59 |
| 57 | 4 | 58 | 58 | 58 | 57 | 57 | 57 |
| 55 | 2 | 56 | 56 | 55 | 55 | 55 | 56 |
| 53 | 0 | 54 | 53 | 53 | 53 | 54 | 54 |
| 51 | 10 | 51 | 51 | 51 | 52 | 52 | 52 |
| 49 | 8 | 49 | 49 | 50 | 50 | 50 | 49 |

FIG. 28 DIATONIC PITCH NUMBERS SHARP KEY SIGS.

| FRONT DIGITAL NOS. | | J = DIATONIC MUSICAL KEY PARAMETER, KEYNOTE | | | | | | | |
|---|---|---|---|---|---|---|---|---|---|
| D | $Q_0$ | 0-C | 1-G | 2-D | 3-A | 4-E | 5-B | 6-F | 7-C |
| 86 | 10 | 83 | 83 | 83 | 83 | 83 | 83 | 83 | 84 |
| 84 | 10 | 81 | 81 | 81 | 81 | 81 | 82 | 82 | 82 |
| 82 | 10 | 79 | 79 | 79 | 80 | 80 | 80 | 80 | 80 |
| 80 | 10 | 77 | 78 | 78 | 78 | 78 | 78 | 78 | 78 |
| 78 | 9 | 76 | 76 | 76 | 76 | 76 | 76 | 77 | 77 |
| 76 | 9 | 74 | 74 | 74 | 74 | 75 | 75 | 75 | 75 |
| 74 | 9 | 72 | 72 | 73 | 73 | 73 | 73 | 73 | 73 |
| 72 | 8 | 71 | 71 | 71 | 71 | 71 | 71 | 71 | 72 |
| 70 | 8 | 69 | 69 | 69 | 69 | 69 | 70 | 70 | 70 |
| 68 | 8 | 67 | 67 | 67 | 68 | 68 | 68 | 68 | 68 |
| 66 | 8 | 65 | 66 | 66 | 66 | 66 | 66 | 66 | 66 |
| 64 | 7 | 64 | 64 | 64 | 64 | 64 | 64 | 65 | 65 |
| 62 | 7 | 62 | 62 | 62 | 62 | 63 | 63 | 63 | 63 |
| 60 | 7 | 60 | 60 | 61 | 61 | 61 | 61 | 61 | 61 |
| 58 | 6 | 59 | 59 | 59 | 59 | 59 | 59 | 59 | 60 |
| 56 | 6 | 57 | 57 | 57 | 57 | 57 | 58 | 58 | 58 |

FIG. 29 HEXACHORD KEY OF C
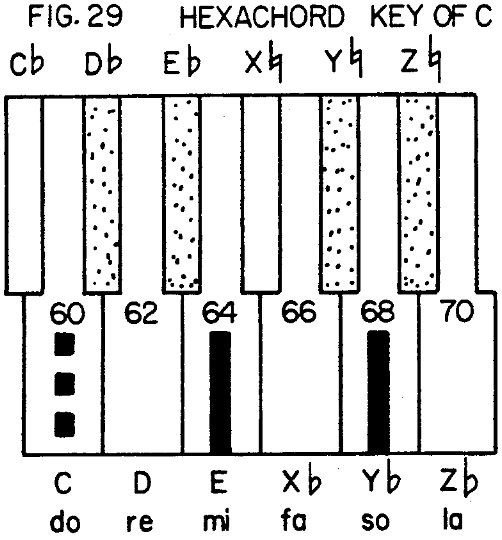
FIG. 30 HEXACHORD KEY OF C♯
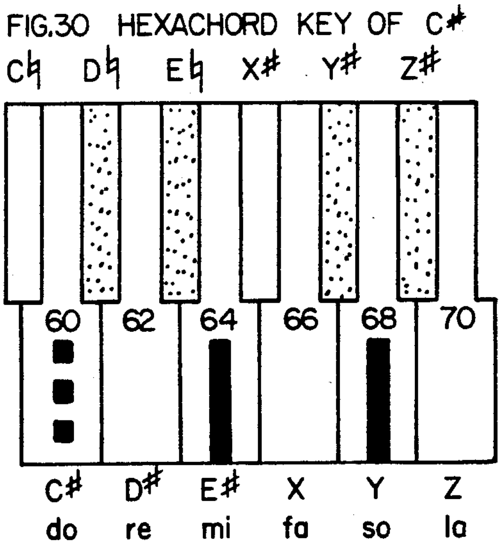
FIG. 31 HEXACHORD KEY OF D
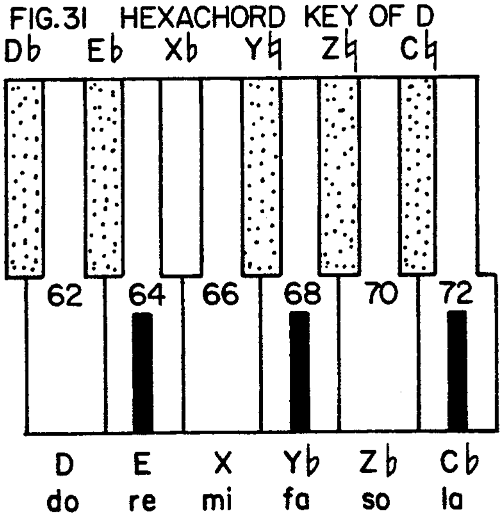
FIG. 32 HEXACHORD KEY OF D♯
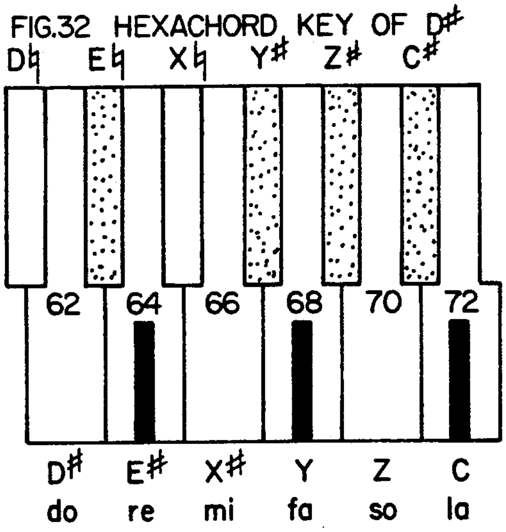
FIG. 33 MAJORCHORD SCALE
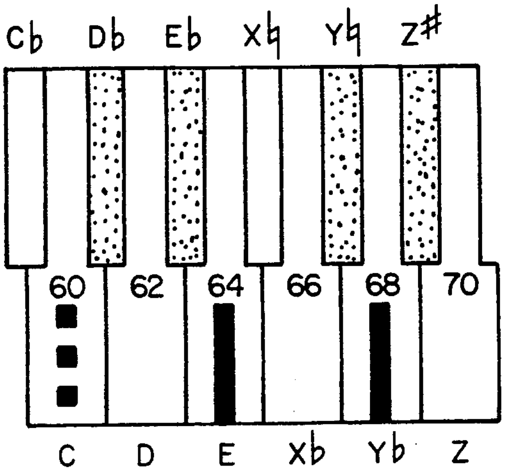
FIG. 34 DOUBLE MAJOR SCALE
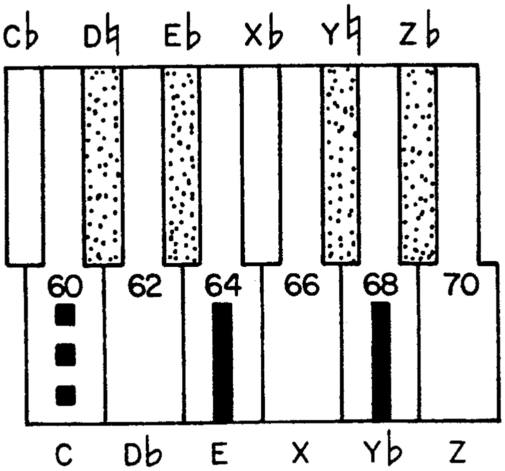

FIG. 35

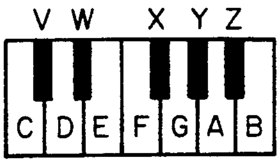

FIG. 36

| | SIX-TONE MUSICAL SCALES | 0 C | 1 V | 2 D | 3 W | 4 E | 5 F | 6 X | 7 G | 8 Y | 9 A | 10 Z | 11 B |
|---|---|---|---|---|---|---|---|---|---|---|---|---|---|
| 1 | WHOLE TONE | C | | D | | E | | X | | Y | | Z | |
| 2 | HEXACHORD | C | | D | | E | F | | G | | A | | |
| 3 | MAJORCHORD | C | | D | | E | F | | G | | | Z | |
| 4 | MINORCHORD | | V | | W | | | X | | Y | A | | B |
| 5 | DOUBLE MAJOR | C | V | | | E | | X | G | | | Z | |
| 6 | DOUBLE MINOR | | | D | W | | F | | | Y | A | | B |
| 7 | UDSONES | | | D | W | | | X | | Y | A | | B |
| 8 | UDSTHREES | C | V | | | E | F | | G | | | Z | |
| 9 | SIXTRIAD | C | | | W | E | | | G | Y | | | B |

FIG. 37

| | DICHOTOMIES OF SIX-TONE SCALES | DISCRETE CONSONANT TRIADS | | SCALE INTER-TONE INTERVALS | TOTAL SCALE INTERVALS 1 | 2 | 3 | 4 | 5 | 6 |
|---|---|---|---|---|---|---|---|---|---|---|
| 1 | WHOLE-TONE | | | 2-2-2-2-2-2 | 0 | 6 | 0 | 6 | 0 | 6 |
| 2 | HEXACHORD | C-E-G | D-F-A | 2-2-1-2-2-3 | 1 | 4 | 3 | 2 | 5 | 2 |
| 3 | MAJORCHORD | C-E-G | Z-D-F | 2-2-1-2-3-2 | 1 | 4 | 3 | 2 | 4 | 2 |
| 4 | MINORCHORD | X-A-V | Y-B-W | 2-3-2-1-2-2 | 1 | 4 | 3 | 2 | 4 | 2 |
| 5 | DOUBLE MAJOR | C-E-G | X-Z-V | 1-3-2-1-3-2 | 2 | 2 | 4 | 2 | 2 | 6 |
| 6 | DOUBLE MINOR | D-F-A | Y-B-W | 1-2-3-1-2-3 | 2 | 2 | 4 | 2 | 2 | 6 |
| 7 | UDSONES | D-X-A | Y-B-W | 1-3-2-1-2-3 | 2 | 2 | 4 | 2 | 2 | 4 |
| 8 | UDSTHREES | C-E-G | Z-V-F | 1-3-1-2-3-2 | 2 | 2 | 4 | 2 | 2 | 4 |
| 9 | SIXTRIAD | | | 3-1-3-1-3-1 | 3 | 0 | 3 | 3 | 3 | 0 |

FIG. 38 DICHOTOMIES OF THE TWELVE TONE SCALE

| TONIC MUSICAL SCALE | | | + | CHROMATIC MUSICAL SCALE | | |
|---|---|---|---|---|---|---|
| WHOLE TONE | C-E-Y | D-X-Z | + | WHOLE TONE | V-F-A | W-G-B |
| HEXACHORD | C-E-G | D-F-A | + | HEXACHORD | X-Z-V | Y-B-W |
| MAJORCHORD | C-E-G | Z-D-F | + | MINORCHORD | X-A-V | Y-B-W |
| MINORCHORD | X-A-V | Y-B-W | + | MAJORCHORD | C-E-G | Z-D-F |
| DOUBLE MAJOR | C-E-G | X-Z-V | + | DOUBLE MINOR | D-F-A | Y-B-W |
| DOUBLE MINOR | D-F-A | Y-B-W | + | DOUBLE MAJOR | C-E-G | X-Z-V |
| UDSONES | D-X-A | Y-B-W | + | UDSTHREES | C-E-G | Z-V-F |
| UDSTHREES | C-E-G | Z-V-F | + | UDSONES | D-X-A | Y-B-W |
| SIXTRIAD | C-E-Y | B-W-G | + | SIXTRIAD | D-X-Z | V-F-A |

SCALE SIGNATURES OF SIX TONE MUSICAL SCALES

FIG. 40 MAJORCHORD PITCH NUMBERS FLATS

| FRONT DIGITAL NOS. D | $R_0$ | K=HEXATONIC KEY MUSICAL PARAMETER 0 | | 2 | | 4 | | 6 | | 8 | | 10 | |
|---|---|---|---|---|---|---|---|---|---|---|---|---|---|
| 72 | 0 | 72 | 2 | 72 | 3 | 71 | 2 | 71 | 1 | 72 | 2 | 72 | 2 |
| 70 | 10 | 70 | 3 | 69 | 2 | 69 | 1 | 70 | 2 | 70 | 2 | 70 | |
| 68 | 8 | 67 | 2 | 67 | 1 | 68 | 2 | 68 | 2 | 68 | | 68 | |
| 66 | 6 | 65 | 1 | 66 | 2 | 66 | 2 | 66 | | 66 | | 65 | |
| 64 | 4 | 64 | 2 | 64 | 2 | 64 | | 64 | | 63 | | 63 | |
| 62 | 2 | 62 | 2 | 62 | | 62 | | 61 | | 61 | | 62 | |
| 60 | 0 | 60 | | 60 | | 59 | | 59 | | 60 | | 60 | |

FIG. 41 DOUBLE MAJOR PITCH NUMBERS FLATS

| FRONT DIGITAL NOS. D | $R_0$ | K=HEXATONIC KEY MUSICAL PARAMETER 0 | | 2 | | 4 | | 6 | | 8 | | 10 | |
|---|---|---|---|---|---|---|---|---|---|---|---|---|---|
| 72 | 0 | 72 | 2 | 72 | 3 | 71 | 1 | 72 | 2 | 72 | 3 | 71 | 1 |
| 70 | 10 | 70 | 3 | 69 | 1 | 70 | 2 | 70 | 3 | 69 | 1 | 70 | |
| 68 | 8 | 67 | 1 | 68 | 2 | 68 | 3 | 67 | 1 | 68 | | 68 | |
| 66 | 6 | 66 | 2 | 66 | 3 | 65 | 1 | 66 | | 66 | | 65 | |
| 64 | 4 | 64 | 3 | 63 | 1 | 64 | | 64 | | 63 | | 64 | |
| 62 | 2 | 61 | 1 | 62 | | 62 | | 61 | | 62 | | 62 | |
| 60 | 0 | 60 | | 60 | | 59 | | 60 | | 60 | | 59 | |

MUSICAL EQUIPMENT ENABLING A FIXED SELECTION OF DIGITALS TO SOUND DIFFERENT MUSICAL SCALES

CROSS REFERENCE TO RELATED APPLICATIONS

This application is a continuation-in-part of copending patent application Ser. No. 362,826, filed Jun. 7, 1989, abandoned, which is a continuation-in-part of application Ser. No. 255,751, filed Oct. 11, 1988, now U.S. Pat. No. 4,903,572, which is a continuation-in-part of application Ser. No. 015,718 filed Feb. 17, 1987, abandoned, which is a continuation-in-part of application Ser. No. 921,407, filed Oct. 22, 1986, now U.S. Pat. No. 4,750,399, which is a continuation-in-part of application Ser. No. 736,701, filed May 22, 1985, now U.S. Pat. No. 4,640,173.

BACKGROUND OF THE INVENTION

1. Field of the Invention

A musical scale selector allows the front digitals of a keyboard to play either the diatonic scale or a six-tone musical scale. A six-tone musical scale can provide the basis for an improved music notation.

2. Description of the Prior Art

The diatonic musical scale, which is the traditional basis for Western music, is a group of seven tones that are related by consonant musical intervals and chords. The other five tones of the twelve-tone scale are expressed as sharps or flats of tones of the diatonic scale. Thus the extraneous tone intermediate to the C and D tones is called C sharp or D flat.

In our traditional music notation the tones of the diatonic scale are represented by notes on five-line staffs supplemented by ledger lines. Here a seven-tone scale has the serious disadvantage that notes which are positioned on lines in one octave are instead positioned on spaces in the adjoining octaves. This changeability of the same notes in different octaves obstructs an intimate depiction of the consonant sounds of music. If a single tone is added to or omitted from the diatonic scale, then the resultant musical scale naturally divides into two discrete parts, one of which is written on lines of the musical staff in all octaves, the other part of the musical scale being written in the spaces of the staff in all octaves. Thus each staff line and each staff space is related by consonant musical intervals and chords to neighboring staff lines and spaces, these relationships being the same in all octaves.

For example, notation can be based on the first six tones of the diatonic scale. In this hexachord notation the consonant tones C-G-C-E-G of the valveless bugle are written entirely on the staff lines or ledger lines, even though they occupy adjoining octaves.

There are other advantages to such a modification of music notation. For example, notation based on a six-tone musical scale can have a system of twelve key signatures which is much easier to learn and to use than the traditional system of key signatures. This simpler system of key signatures can be used to write a musical composition at the pitch at which it sounds its best, it is most easily sung, and is easily played. The full enjoyment of music and the full development of music itself are strongly affected by our system of music notation and its conforming musical keyboard.

Music could be more easily taught, learned, composed, and better performed, if its notation were based on a six-tone or twelve-tone musical scale; however, a changeover to a new system of notation encounters serious difficulties. Music pupils would need to learn an improved music notation from teachers originally trained in the traditional notation. The traditional musical keyboard is well adapted to music notation based on the diatonic scale, but ill adapted to notation based on other musical scales; and a child being trained in keyboard music may need to share his keyboard with parents or siblings accustomed to the traditional notation. Furthermore, even after learning to play music in an alternative notation, a child should still be able to play music that is printed in the traditional notation. Any alternative notation must coexist agreeably with the traditional notation.

Much primitive music, such as the Robert Burns song "Auld Lang Syne," is based on the tonal pentatonic scale, which is a group of five tones that are easily sung and played together. The tones C-D-E-G-A of this scale are closely related by consonant musical intervals and chords. This simpler scale is widely used in the Kodaly and Orff methods of music education. The prolific music composer Irving Berlin always composed on the keyboard in the key of F sharp, which emphasizes the tonal pentatonic scale F sharp - G sharp - A sharp - C sharp - D sharp, which is played by the back digitals of the traditional keyboard. Addition of a sixth tone F to the tonal pentatonic scale C-D-E-G-A produces the hexachord C-D-E-F-G-A, which is the basis of a system of music taught by Guido of Arezzo in the eleventh century. Guido developed our representation of musical tones by symbols on a staff consisting of horizontal lines.

Guido also invented our tonic sol-fa system, using syllables to denote the six degrees of the hexachord. A seventh syllable "si" was added in the sixteenth century to denote the leading tone of the diatonic scale. The diatonic scale C-D-E-F-G-A-B contains within it the two identical hexachords C-D-E-F-G-A and G-A-B-C-D-E, whose keynotes are spaced apart by the musical interval of a fifth. And the hexachord scale C-D-E-F-G-A contains the two identical pentatonic scales F-G-A-C-D and C-D-E-G-A, whose keynotes are spaced apart by a fifth.

So that people accustomed to the traditional notation can confidently play music written in a six-tone notation, and so that people trained in such hexatonic notation can also play music written in the traditional notation, hexatonic notation is preferably written on five-line staffs like the traditional notation. An octave in hexatonic notation occupies only 3 spaces on the musical staff, as compared with 3½ spaces for the traditional notation. Thus the treble and bass staffs which cover 37 tones in the traditional notation will cover 43 tones in six-tone notation, with the result that fewer ledger lines are needed. An unexpected benefit of the more compact notation is that corresponding staff lines in two adjoining musical staffs notate tones exactly two octaves apart. So the lines and spaces of the bass staff are labeled exactly the same as those in the treble staff, and mental images of the two staffs tend to reinforce each other, rather than conflict.

Our traditional musical keyboard is structured so as to play the seven tone diatonic scale on its front digitals and the other five tones of the twelve tone scale on its back digitals. The notes of written keyboard music are normally interpreted as instructions to play particular digitals of the keyboard. Thus the major mode of the diatonic scale, starting with a C note, is started on a C front digital. The succeeding D, E, F, G, A, B notes of written music are played on the succeeding D, E, F, G, A, B front digitals of the keyboard.

So that keyboard players trained in either the traditional notation or hexatonic notation can easily play music written in the other notation, I have devised apparatus for switching the electrical connections between keyboard digitals and their tone generators, disclosed in U.S. Pat. Nos. 3,986,422, 4,009,633 and 4,640,173. The change between notations is greatly eased by providing automatic key signature actuation for music written in both the traditional notation and the hexatonic notation. A musician trained in one system need not learn the music staff labels of the other system, but can simply play the keyboard digitals according to the positioning of the notes on the musical staffs, thinking of his accustomed staff labels if he wishes, and using his accustomed keyboard landmarks. The apparatus also allows the front digitals to play the whole tone scale, with the back digitals playing an interspersed whole tone scale. This arrangement is most suitable for playing music written in twelve-tone notation, which does not use key signatures. At the present time it appears that twelve tone notation is most suitable for instrumental atonal music, while hexatonic notation is more suitable for instrumental and vocal tonal music. Players of acoustic musical instruments and singers must still contend with key signatures in hexatonic notation, but it turns out that hexatonic key signatures can be learned and used much more easily than the traditional diatonic key signatures.

In modern musical practice it is common to have a keyboard separate from its sound generator, the keyboard transmitting binary coded messages serially on a pair of wires to the sound generator. When a digital of the keyboard is pressed, a number identifying that digital is transmitted to the sound module, where it is used to sound a musical tone of the proper pitch. My U.S. Pat. Nos. 4,903,571 and 4,903,572 disclose translating apparatus whereby such transmission of numbers to a sound generator is altered so as to automatically actuate the sharps or flats in any diatonic key signature of written music. Thus tonal music can be played without regard to the key signature, most notes being played on the front digitals of the keyboard.

SUMMARY OF THE INVENTION

Musical equipment comprising a musical keyboard, a sound generator and translating apparatus enables the row of front digitals of the musical keyboard to sound either the diatonic scale or a defined six-tone musical scale. Thus music written by alternative methods of notation can be played on the keyboard by a musician trained in either one of the methods. Musical notation based on a six-tone musical scale can depict intimately the consonant sounds of music, and it can have a system of key signatures that is much easier to learn and to use than the key signatures of the traditional notation, which is based on a seven-tone musical scale.

When a keyboard digital is played, a digital identifying number for that keyboard digital is transmitted in binary code for a separate sound generator. Translating apparatus intercepts this transmission and transforms the digital numbers into associated pitch numbers in such a way that the front digitals of the keyboard can play either the diatonic scale or a six-tone scale, and can play either scale in any musical key, with its key signature automatically actuated. When the front digitals of the keyboard are playing the seven or six tone scale, the back digitals can play the remaining tones of the twelve tone scale.

For each musical scale in all its musical keys the pitch numbers are preferably stored in an electronic look-up table, the digital numbers from the keyboard serving as addresses in the look-up table. When a digital of the keyboard is played, a binary coded "Note On" message accompanied by the identifying digital number is sent to the translating apparatus, where an associated pitch number is retrieved from the electronic memory. This pitch number is immediately transmitted to the sound module, which generates a musical tone of the proper pitch.

When musical notation is based on a six-tone musical scale consisting of two discrete major triads, then all the lines of the musical staffs in all octaves can notate the tones of a first series of major triads with their root tones spaced apart by an octave. At the same time all the spaces of the musical staffs in all octaves can notate the three triad tones of a discrete series of major triads, with their root tones positioned two semitones below the root tones of the first series of major triads. This particular musical scale can be derived from the diatonic scale by omission of its E tone. If instead the B tone is omitted from the diatonic scale to give the hexachord scale, then the lines of the musical staffs can still notate all of the tones of a series of major triads in all octaves, but the spaces of the musical staffs will then notate all the tones of a discrete series of minor triads in all octaves.

Alternatively, all the lines of the musical staffs in all octaves can notate a uniform series of tones spaced apart by four semitones, while the spaces of the staffs can notate a second uniform series of tones spaced apart by four semitones, the tones of the second series positioned a semitone below the tones of the first series. Then every line of every musical staff will notate the root tone of a major triad, contained in the six-tone musical scale, the second tone of the triad being notated on the next line up, and the third tone being notated in the space above that. At the same time every line of every musical staff will notate the root tone of a minor triad contained in the musical scale, the second tone of the triad being notated in the next space up, and the third tone of the triad notated in the space above that.

An object of the invention is to ease the reading and writing of music by easing the adoption of an alternative music notation.

BRIEF DESCRIPTION OF THE DRAWINGS

FIG. 3 tabulates notes and intertone musical intervals of the two hexachord scales.

FIGS. 6 and 7 show a musical melody written in the traditional and hexachord notations.

FIG. 8 shows nomenclature for the twelve tone musical scale using symbols derived from the diatonic scale and the whole tone scale.

FIGS. 9–14 show key signatures for the diatonic and hexachord musical scales.

FIGS. 15–17 shows the musical melody written in different musical keys of the hexachord scale.

FIG. 18 shows a traditional musical keyboard having its digitals marked to ease playing also from music written in hexatonic notation.

FIG. 21 is a table of standard MIDI pitch numbers for eighty-four musical tones.

FIGS. 22–24 show different parts of the translating apparatus.

FIGS. 25 and 26 show look-up tables of pitch numbers which are to be transmitted from the translating apparatus when fifteen front digitals of the keyboard are playing the hexachord scale in different musical keys, with its key signatures automatically actuated.

FIG. 27 shows pitch numbers which are transmitted by the translating apparatus when sixteen back digitals of the keyboard are playing a chromatic hexachard scale for different musical keys of written music, with its key signatures automatically actuated.

FIG. 28 shows a look-up table of pitch numbers for playing the diatonic scale on the front digitals in different musical keys with its key signatures automatically actuated.

FIGS. 29–32 show the notes which are sounded by keyboard digitals when the front digitals are playing the hexachord scale in different musical keys, with its key signatures automatically actuated.

FIGS. 33 and 34 show the notes sounded by keyboard digitals when the front digitals are playing the majorchord and double major musical scales in the key of C.

FIG. 35 shows independent nomenclature for all of the tones of the twelve tone scale.

FIG. 36 lists constituent tones of nine different six-tone musical scales.

FIG. 37 lists the discrete consonant triads which constitute seven six-tone musical scales.

FIG. 38 lists dichotomies of the twelve tone scale into nine pairs of six-tone scales and of each six-tone scale into pairs of discrete triads.

FIGS. 40 and 41 list pitch numbers which are transmitted by the translating apparatus when front digitals of the keyboard are playing the majorchord and double major muscial scales in different musical keys, with their key signatures automatically actuated.

DESCRIPTION OF THE PREFERRED EMBODIMENT

Figure 1:
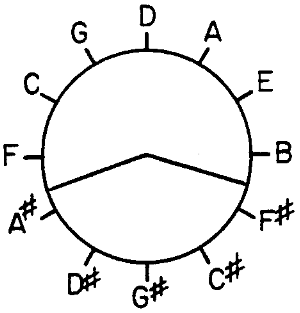
FIG. 1 shows tones of diatonic and pentatonic scales in the circle of fifths.

The series of "quintessential" musical scales that includes the diatonic scale and the tonal pentatonic scale includes also the hexachord scale. These quintessential musical scales consist of tones that are consective in the circle of fifths, shown in FIG. 1. Referring to FIG. 1, in the circle of fifths each tone is related by the musical interval of a fifth to each of the tones next to it. The seven consective tones in the circle labeled, F, C, G, D, A, E, B constitute a diatonic scale. The remaining five tones of the circle constitute a tonal petatonic scale. As seen in FIG. 1, a hexachord scale can be derived from the diatonic scale by omitting either its F tone or its B tone. These two choices will give the same basic hexachord scale, since the musical intervals will be the same. The choice is merely one of nomenclature.

Figure 2:
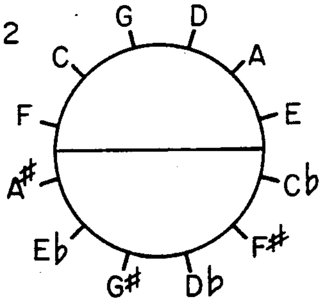
FIG. 2 shows tones of two hexachord scales in the circle of fifths.

An object of the present invention is to assist adoption of an alternative notation, so that music pupils can learn a better system from teachers originally trained in the traditional system, and so that the music pupils can also play the storehouses of music printed in the traditional notation. For this purpose it is desirable to have the same names for tones of a six-tone scale that are familiar in the diatonic scale. For teaching hexachord notation we omit the B tone from the diatonic scale so that the tones F, C, G, D, A, E constitute our tonal hexachord, as shown in FIG. 2. These six tones are commonly used in tonal musical compositions.

Referring to FIG. 2, the B tone, relabeled C flat, joins the other five tones of the twelve tone scale to form a "chromatic hexachord." In tonal musical compositions the six tones of the chromatic hexachord are generally used less commonly than the six tones of the tonal hexachord.

Referring to FIG. 3, within a single octave the tones of the major mode of the tonal hexachord scale are in the order C-D-E-F-G-A, with intertone musical intervals to 2-2-1-2-2-3 semitones. Within a single octave the tones of the chromatic hexachord are in order F sharp, G sharp, A sharp, C flat, D flat, E flat, with the same intertone musical intervals of 2-2-1-2-2-3 semitones. The first tone F sharp of the chromatic hexachord is half an octave higher (or lower) than the first tone C of tonal hexachord.

A musical staff effects a dichotomy of a six-tone musical scale into a pair of triads, one of which is notated on the lines of the musical staff in all octaves, while the other member of the pair of triads is notated in the spaces of the musical staff in all the octaves. This dichotomy of the hexachord scale is shown in FIG. 5.

Figure 4:
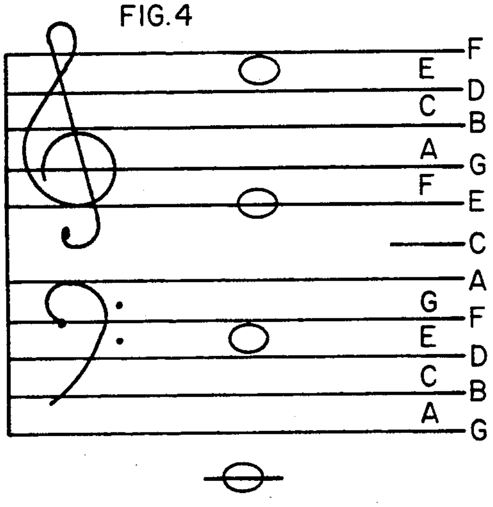
FIGS. 4 and 5 show labeling of musical staff lines and spaces for the traditional notation and for hexachord notation.
Figure 5:
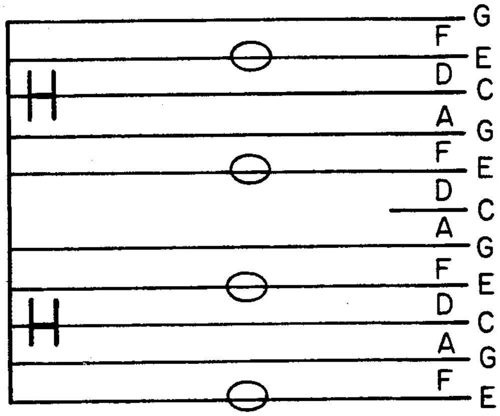

Referring to FIG. 5, the "H" at the front of the staff indicates hexachord notation. Five-line staffs are used for compatibility with the traditional staff notation. The eleven staff lines notate only the three tones C-E-G of C major triads, the C notes being positioned on the centerline of each staff and on a ledger line. Spaces of the staffs notate only the three tones D-F-A of discrete D minor triads. Because of the compactness of hexachord notation, lines of the bass staff are labeled the same as lines of the treble staff, namely E-G-C-E-G. This compact labeling compares favorable with that of the traditional staffs shown in FIG. 4, where the treble staff is labeled E-G-B-D-F and the base staff is differently labeled G-B-D-F-A. In the hexachord staffs of FIG. 5 the four E notes shown, for example, are all positioned on the staff lines, whereas for the traditional staffs of FIG. 4, two of the E notes are in staff spaces and a ledger line is needed for the lowest E note.

Figure 6:
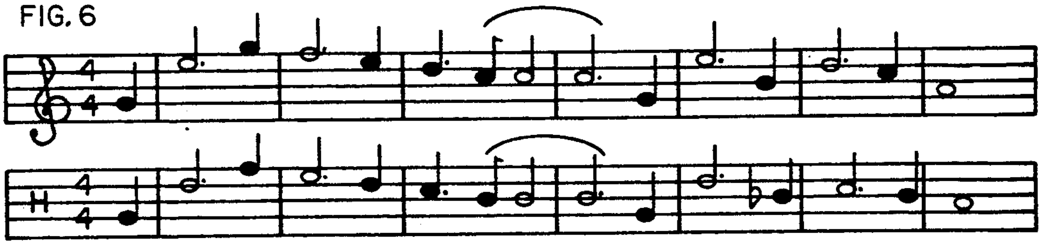

For comparison of the traditional and hexachord notations, eight bars of a song are shown in FIGS. 6 and 7 respectively. Referring to FIG. 7, all notes below the centerline of the hexachord staff are positioned identically to those in the traditional staff of FIG. 6. On the other hand, notes higher on the hexachord staff are positioned identically to the octave related notes below the hexachord staff centerline. Thus in FIG. 7 the first note (middle G) is positioned on the second line above the middle C ledger line, and the third note (high G) is positioned on the second line above the high C centerline. Here the octave relationship of the first and third notes is evident. On the other hand, in the traditional notation of FIG. 6 the octave relationship is not so evident, because the third note is higher up and not on a line like the first note. In the hexachord notation of FIG. 7, the first three notes, being on lines, are obviously notes of a C major triad. This relation is not so evident in the traditional notation because the notes are not all on lines. Thus six-tone systems of notation have advantages in ear training for singing and for playing stringed musical instruments such as violins.

In order to ease playing from music written in hexachord notation, the lines of both musical staffs can be marked on the front digitals of the traditional keyboard, as shown in FIG. 18.

Referring to FIG. 18, the middle C front digital is marked with black tape to show a dotted line representing the ledger line between the two five line staffs. Front digitals above the treble staff and below the bass staff are similarly marked. The B front digitals are marked gray to indicate that they are among the six digitals per octave span that play notes extraneous to the tonal hexachord scale. Playing hexachord notation is made still easier by moving the C flat digital to the back of the keyboard, as shown in FIG. 19.

Figure 19:
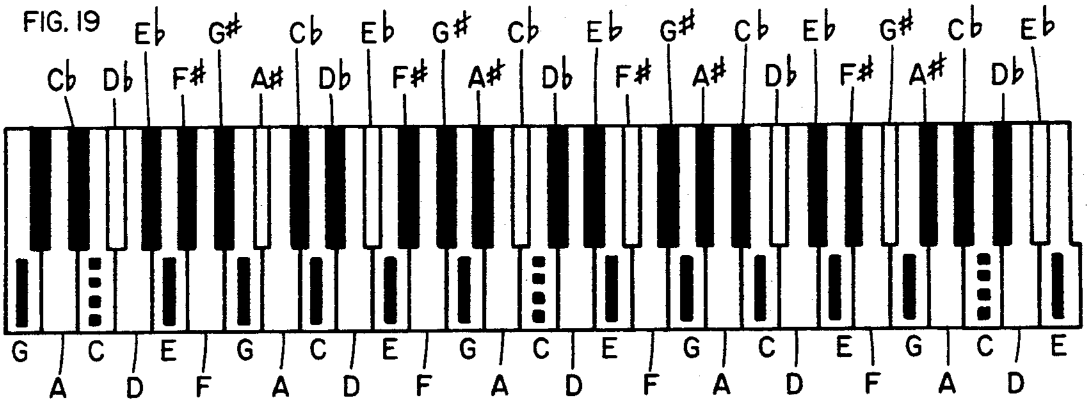
FIG. 19 shows a musical keyboard which has been modified so as to improve automatic actuation of the traditional key signatures and so as to ease playing from music written in hexatonic notation.

Referring to FIG. 19, this keyboard has six front digitals and six back digitals per octave span. The front digitals play the tonal hexachord scale consisting of the major traid C-E-G and the discrete minor triad D-F-A. The treble and bass straffs are marked on the front digitals to serve as landmarks for playing from either the hexachord notation or the traditional notation. Two out of every seven back digitals are colored white so as to divide the black digitals into groups of two and three. These groups serve as landmarks for musicians trained on the traditional music keyboard.

If a musical keyboard is equipped with a uniform pitch changer, all of its music could be written in the key of C, and the pitch at which any musical composition is sounded could easily be changed. However, in an orchestra many of the musical instruments do not have uniform pitch changers, so that the best music is usually written in another key at which is sounds better and is fairly easily sung. Such music is written using a key signature at the front of each line of the music.

The traditional key signatures contain from one to seven sharps or from one to seven flats. The fourteen traditional key signatures are tabulated in FIG. 9.

Referring to FIG. 9, the number of flats or sharps in each diatonic key signature is shown at the top of the table, this number of flats or sharps varying in the dependence on the keynote. The keynote for each key signature is shown at the bottom of the table. The first column lists the seven notes of the diatonic scale in the standard key of C. The key signature corrections to each of these notes in the other musical keys are shown in the body of the table. Half of the key signatures contain only flats; the other half of the key signatures contain only sharps. The fourteen traditional key signatures are somewhat difficult to learn and difficult to use when playing musical instruments. So publishers often compromise the quality of music by printing it in the less difficult musical keys.

This difficulty arises because the sharps and flats represent corrections to the diatonic scale in the key of C, in which the musical tones are unevenly spaced. Thus to raise the pitch of a musical composition by a single semitone requires a key signauter of five flats or seven sharps. To raise the pitch two semitones requires a key signature of two sharps. To raise the pitch three semitones requires a key signature of three flats, to raise the pitch four semitones requires a key signature of four sharps, and so on in a rather irregular way. This irregularity, which makes the traditional key signatures difficult to learn and to use, is caused by the uneven distributin of tones in the reference scale, which is the diatonic scale in the key of C. An important advantage of hexatonic notation is that any six-tone musical scale in any musical key can be represented as a modification of the whole tone scale, which has six evenly spaced tones. As a result, the grouping of flats or sharps in a key signature is the same for all key signatures, and this grouping of flats or sharps always has the same relationship to the keynote.

A comparison of tone symbols referred to the diatonic scale and to the whole tone scale is shown in FIG. 8. Referring to FIG. 8, the tones of the whole tone scale, which are evenly spaced from each other by a musical interval of two semitones, are labeled C-D-E-X-Y-Z. A tone intermediate to the X and Y tones, for example, is labeled X sharp or Y flat. Using this whole tone nomenclature, the twelve key signatures for the hexachord scale are shown in FIG. 10.

Referring to FIG. 10, The top of the table shows the hexatonic musical key parameter K, which is an even integer running from zero to ten. The keynotes for twelve musical keys of the hexachord scale are shown at the bottom of the table. The first column lists the six notes C,D,E,X,Y,Z of the basic whole tone scale. The key signature modification of these notes is shown in the body of the table. Each key signature contains either three flates or three sharps, and these sharps or flats are always on three successive notes of the whole tone scale. The group of sharps or flats is always related in the same way to the keynote of the musical scale, which keynote is always the first sharped or unflatted note. The twelve hexachord key signatures are illustrated in FIGS. 11 and 12.

Referring to FIG. 11, the W at the front end of the musical staff indicates that whole tone nomenclature is being used in this staff. The five lines of the musical staff are labeled E, Y, C, E, Y. The four staff spaces are labeled X, Z, D, X. On the staff are shown flat key signatures for the hexachord keys of C, D, E, X, Y, Z, which correspond to the musical key parameter values 0, 2, 4, 6, 8, 10 respectively. For each musical key the flat symbols are positioned on the next three lines and spaces below the line or space occupied by the keynote. The hexachord key signature for the keys of C sharp, D sharp, E sharp, X sharp, Y sharp, and Z sharp are shown in FIG. 12.

Referring to FIG. 12, the musical staff is identical to that in FIG. 11, but the flats have been removed and the notes that were not flatted are now sharped. Thus the key signatures with sharps raise the pitch of the hexachord scale by a semitone above that produced by the corresponding signatures with flats. Here the keynote is always the lowest sharped note. Key signatures for the musical keys of C and C sharp are shown in FIGS. 13 and 14.

In FIG. 13, both musical staffs have the same labeling as in FIG. 11, and the corresponding Guidonian syllables are also shown. The three notes C, E, Y flat depict the C major triad do-mi-so, which occupies all the lines of both staffs. The other three hexachord notes D, X flat, Z flat depict the D minor triad re-fa-la, which occupies all the spaces of both staffs. The root tone "re" of the minor triad is two semitones above the root tone "do" of the major triad. In FIG. 14 the Guidonian syllables with movable "do" have the same positions on the musical staffs as in FIG. 13, but any note of the hexachord scale should be sounded a semitone higher than a note having the same position on the staffs of FIG. 13. The whole tone scale sign with the key signature for the hexachord scale in the key of C, shown in FIG. 13, are together equivalent to the hexachord scale sign shown in FIG. 5. The musical melody written in hexachord notation in FIG. 7 is shown written in whole tone notation for the hexachord scale in FIGS. 15–17.

Referring to FIG. 15, except for the whole tone scale sign and the key signature for the hexachord key of C, which flats the notes X, Y, Z, the appearance of the written music is exactly the same as in FIG. 7. The accidental in the sixth measure is here also labeled as C flat.

Referring to FIG. 16, here the pitch of the hexachord scale has been lowered by four semitones to the key of Y. This key signature flats the notes D, E, X. Notes in the body of the written music appear the same as in FIG. 15 except that they have been lowered by one space. The accidental in the sixth measure now appears as Y flat.

Referring to FIG. 17, here the pitch of the hexachord scale is a semitone higher than in FIG. 16, the key signature sharping the notes Y, Z, C, notes in the body of the written music are the same as in FIG. 16, except that the accidental in the sixth measure now appears as Y natural instead of Y flat.

These whole tone key signatures are easier to learn and to use when playing than the traditional key signatures for the diatonic scale. The twelve hexachord key signatures all contain either three sharps or three flats, and they always have the same relationship to the keynote, which is the first sharped or unflatted note in the key signature. On a two-row musical keyboard such as that shown in FIG. 20 there can be only two different relative fingerings of a musical composition, depending on whether the key signature has flats or sharps.

In common musical practice, when a keyboard digital is played, a digital identifying number for that digital is transmitted to a separate sound generator. The transmission to the sound module of a binary coded "note on" message accompanied by the digital identifying number tells the sound module to generate a musical tone of the appropriate pitch. The keyboard commonly transmits "note on" and "note off" messages to the sound module by a standard method of "Musical Instrument Digital Interface" (MIDI). Specifications for MIDI are released in the United States by the MIDI Manufacturers Association and the International MIDI Association, both in Los Angles, Calif. My translating apparatus modifies this type of message transmission as indicated in FIG. 20.

Figure 20:
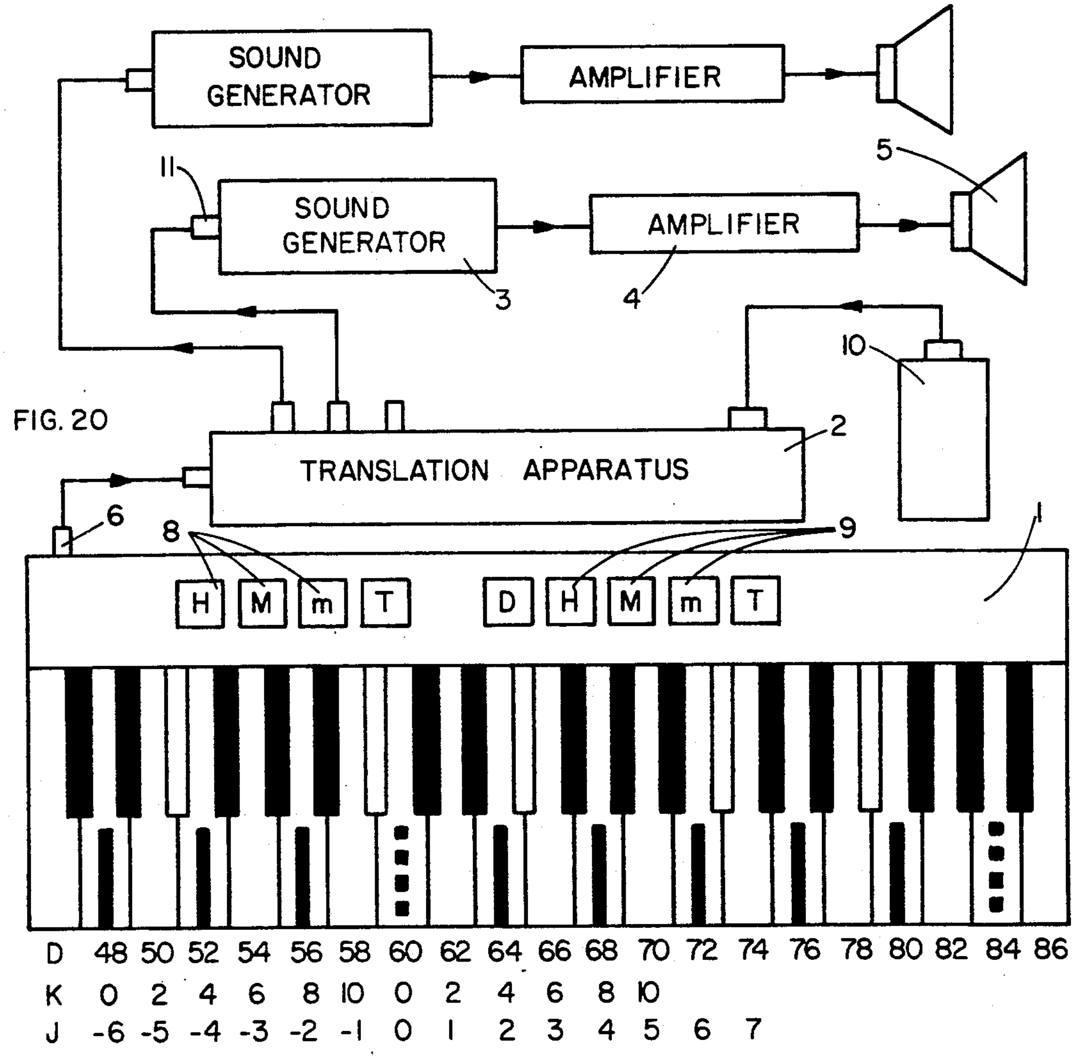
FIG. 20 shows translating apparatus for changing the musical scale sounded by the front digitals of a musical keyboard.

Referring to FIG. 20, keyboard 1 contains two classes of digitals, referred to hereafter as front and back digitals, the front digitals are assigned digital numbers ranging from 46 to 86. Consecutive front digital numbers differ from each other by two. These digital numbers, when unmodified by translating apparatus 2, will tell sound generator 3 to sound the whole tone scale C, D, E, X, Y, Z. Similarly, the back digital numbers tell sound generator 2 to sound the interposed whole tone scale. When a digital is pressed its identifying digital number is transmitted from MIDI output terminal 6. Electric circuitry for detecting each depressed keyboard digital and immediately transmitting its identifying number is well known to those skilled in the art of MIDI equipped keyboards. In this circuitry the keyboard is scanned and keyboard digitals counted off. When a depressed keyboard digital is detected its number containing seven binary digits (bits) is immediately transmitted serially from the counter. Such circuitry for detecting the depression or release of keyboard digitals and immediately transmitting seven bit numbers identifying these events is described by Coles in U.S. Pat. No. 4,750,399, col. 13, line 6 to col. 14, line 34 and by Salani in U.S. Pat. No. 4,686,880. Apparatus for both encoding and decoding such keyboard digital signals has been disclosed by Groeschel in U.S. Pat. No. 4,023,456.

The positioning of the back digitals of keyboard 1 in FIG. 20 is ideal for automatic actuation of the traditional key signatures.

The keyboard shown in FIG. 20 differs from the usual MIDI equipped keyboard in having a back digital between each pair of adjacent front digitals.

One way to obtain a MIDI equipped keyboard like that shown in FIG. 20 is to rearrange the digitals in a MIDI equipped keyboard having the conventional arrangement of digitals. It will not be necessary to change the contacts or wiring, because if the digitals alone are rearranged as shown in FIG. 20, then the row of front digitals will naturally be transmitting a sequence of digital numbers having an increase of two between consecutive front digitals, as shown in FIG. 20.

Referring to FIG. 20, the front digitals are marked with black tape to represent lines of the treble and bass staffs, and marked with dotted lines to represent ledger lines immediately above and below the musical staffs. These marks aid musicians playing from hexachord notation and beginners that may be learning to play from the traditional notation. If the keyboard will be used by musicians trained on the traditional keyboard, then two out of each seven back digitals should be marked with white tape as shown in FIG. 20 to divide the black back digitals. The groups of two and three black back digitals serve as landmarks for those musicians trained on the traditional keyboard.

Referring to FIG. 20, the MIDI message transmitted from output terminal 6 are intercepted by translating apparatus 2, which serves to select different musical scales according to the notation of written music being read by the musician, and to actuate any key signature in the written music.

Referring still to FIG. 20, translating apparatus 2 contains a MIDI receiver, a number changer having different states of operation, and a MIDI transmitter. The translating apparatus receives the MIDI message from keyboard 1 and changes them before transmitting them to sound generator 3 so as to make the front digitals of the keyboard play either the diatonic scale or a six-tone musical scale, and to automatically actuate the flats and the sharps in the diatonic or hexatonic key signature. Sound generator 3 is a commercial unit such as the Roland MKS-30 or MKS -50 sound module. This unit feeds amplifier 4 and loudspeaker 5, which sound tones in accordance with MIDI messages received on MIDI input terminal 11.

The musical tones produced in sound generator 3 when it receives pitch numbers are shown in FIG. 21. The body of this table show eighty-four standard pitch numbers ranging from 24 to 107. The musical tones produced in the sound generator by these standard pitch numbers are shown by the octave number in the first column and the whole tone symbol for the tone within the octave, shown at the top of the table. For example, the standard pitch number to generate the middle C tone is 60. Inspection of FIG. 21 shows that each pitch number difference of N produces a musical interval of N semitones.

The MIDI "note on" and "note off" messages, with their accompanying digital numbers, are transmitted in binary code serially on a pair of wires from the keyboard to the translating apparatus. The MIDI messages with accompanying pitch numbers are then transmitted in binary code serially from the translating apparatus on a pair of wires to the sound generator. The MIDI receiver in the translating apparatus 2 is like that in the standard commercial sound module 3, receiving on MIDI terminal 11. The keyboard player selects the musical scale by means of pushbutton arrays on the keyboard.

Referring again to FIG. 20, pressing the pushbutton labeled "H" in pushbutton array 8 selects a group of number changer states which are used to actuate the hexachord key signatures for different musical keys. In this case, when digital numbers D are received from the keyboard digitals, their associated pitch numbers P are related to the digital numbers D by equation (1)

$$P=D+M+U \quad (1)$$

where

M=0 for R=0, 2, 4,

M=−1 for R=6, 8, 10, where R is the integral remainder after dividing the quantity D-N-K by 12, where K is a hexatonic musical key parameter, which is an even integer in the range zero to ten inclusive. For the front digital numbers shown in FIG. 20, the remainder R also is an even integer in the range zero to ten inclusive. For all front digitals, N is an integer that is constant for all values of D and K. For the front digital numbers shown in FIG. 20 the integer N is equal to zero. The integer U is equal to zero for key signatures of flats and equal to one for key signatures of sharps.

Since the digital numbers for the front digitals shown in FIG. 20 are identical to the pitch numbers for a whole tone scale, non-zero values of M produce a modification of the whole tone scale. The values of R shown above for M=−1 are those values that produce the flats in the key signatures of FIG. 11.

The pitch numbers for the back digitals can be arranged in different ways. The preferred arrangement has the pitch numbers in the order of the digital numbers of the back digitals, so as to form a chromatic hexachord starting seven digitals to the left or five digitals further to the right on the keyboard than the tonal hexachord starts on the front digitals. Thus the chromatic hexachord pitch numbers P for the back digitals are still related to their digital numbers D by equation (1), but the value of N for the back digitals is equal to minus seven or plus five. Since the first tone of the chromatic hexachord is six semitones below the first tone of the tonal hexachord, the value of U for the back digitals is +1 for key signatures of flats and +2 for key signatures of sharps. The relative fingering of a musical composition will be the same in all hexachord musical keys, provided that the integers N and U are constant for all values of K, having a first fixed set of values for all of the front digitals and a second fixed set of values for all of the back digitals.

Referring to FIG. 20, the values of the hexatonic musical key parameter K are selected by stepping on shift switch 10 and pressing one of the twelve musical key selecting front digitals of the keyboard as indicated at the bottom left in FIG. 20. The leftmost set of six values of K selects six-tone key signatures with flats. The right hand set of six values of K selects key signatures with sharps. Shift switch 10, which is operated as a footswitch, has the effect of shifting the MIDI messages from these keyboard digitals into a set of electronic switches contained in translating apparatus 2, which switches serve to select a state of operation of the number changer which automatically actuates the desired key signature. The electronic circuitry necessary to decode the MIDI messages and to address these switches is well known to persons skilled in the art of MIDI responding sound generators, the MIDI messages and pitch numbers received in commercial sound module 3 being used to address a similar set of electronic switches that select and sound different musical tones.

To select a hexatonic key signature, one momentarily steps on footswitch 10 and simultaneously presses one of the hexatonic key signature selecting digitals indicated in FIG. 20. For example, to actuate a hexatonic key signature having flats and K=4, one presses the front digital numbered 52. The hexachord pitch numbers P could be calculated while the music is being played, but preferably the pitch numbers are calculated beforehand for all digitals and all musical keys, and then stored in an electronic look-up table. The digital numbers D and the hexatonic musical key parameters K are used to address the look-up table. Look-up tables for fifteen front keyboard digitals and twelve hexachord musical keys are shown in FIGS. 25 and 26.

Referring to FIG. 25, the top of the table shows the hexatonic musical key parameter K for key signatures of flats. Two columns on the left show for front digitals the digital numbers D and their remainders R for K=0. The body of the look-up table shows the associated hexachord pitch numbers and their differences from one to another. The fixed selection of the seven digitals 60 to 72 sounds all six modes of the hexachord scale, a mode being characterized by its starting point in the sequence of musical intervals that defines a musical scale. For K=0 the four pitch numbers 60, 62, 64, and 72 are equal to their associated digital numbers. The three pitch numbers 65, 67, 69 are each one less than their associated digital numbers, in accordance with equation (1). Thus the seven different pitch numbers increase from one to another by the sequence of differences 2-2-1-2-2-3. These pitch numbers will sound the major mode of the hexachord scale with intertonal musical intervals of 2-2-1-2-2-3 semitones. For this hexachord musical key the keynote of the major mode has the same pitch as a C note in the traditional diatonic notation.

As the value of K increases the major mode of the hexachord scale moves up the keyboard, one front digital at a time, its pitch continually increasing. The keynote pitch number P starts at 60, increases in steps of two with each increase of K up to a value of P=70 for K=10. A hexachord keynote always corresponds to the first pitch number following the difference "3" in FIG. 25. When the musical scale selector is set for a six-tone state of its number changer, corresponding to a selected value of K, then each two digital numbers D which differ from each other by twelve are associated with two pitch numbers which also differ from each other by twelve. For example, for K=2 the digital numbers 68 and 80 are associated with the pitch numbers 67 and 79, which differ from each other by twelve.

FIG. 26 shows a look-up table of hexachord pitch numbers and their differences for the same group of front digitals, but for key signatures of sharps. The fixed selection of the seven digitals 60 to 72 again sounds all six modes of the hexachord scale, but the pitch numbers here are uniformly higher by one than the corresponding pitch numbers in FIG. 25. The sequences of six differences from one pitch number to another are the same as in FIG. 25, for a uniform change of pitch has no effect on the intertonal musical intervals. Inspection of this table shows that for a particular six-tone state of the number changer, which corresponds to a selected value of K, each two digital numbers D which differ from each other by twelve are again associated with two pitch numbers in the body of the table which differ from each other by twelve.

Since the chromatic hexachord played on the back digitals is five digitals to the right or seven digitals to the left of the tonal hexachord played on the front digitals, a chromatic hexachord for K=0 is played on the seven back digitals having the digital numbers 53 to 65. Pitch numbers for the chromatic hexachord are shown in FIG. 27. Referring to FIG. 27, the top of this look-up table shows the hexatonic musical key parameter K for key signature of flats. The first column shows the back digital numbers D and their remainders after dividing the quantity D+7 by twelve. For K=0, since the chromatic hexachord is pitched only six semitones below the tonal hexachord shown in FIG. 25, the four pitch numbers 54, 56, 58 and 66 are each greater by one than their associated digital numbers. The three pitch numbers 59, 61, 63 are then equal to their associated digital numbers. For each value of K the sequence of differences from one pitch number to the next are the same in FIG. 27 as in FIGS. 25 and 26. Inspection of this look-up table shows that for a particular six-tone state of the number changer, which corresponds to a selected value of K, each two digital numbers D which differ from each other by twelve are again associated with two pitch numbers in the body of the table which differ from each other by twelve.

All accidental notes in written music are played on the back digitals of the keyboard. For keyboard music written in hexatonic notation, when the current key signature has flats, the accidental notes are preferably written as naturals and flats. When the key signature has sharps, the accidental notes are written as naturals or sharps. On the keyboard, then, if the six-tone musical scale has been selected from the left hand array of pushbuttons 8, shown in FIG. 20, then each accidental note will be played on a back digital to the immediate left of its designated front digital, and the *relative* fingering of a musical composition will be the same in all musical keys.

If the musical scale were selected from the right hand array of pushbuttons 9, then each accidental note would be played on the back digital to the immediate right of its designated front digital. Thus if the hexachord scale had been selected by pressing the pushbutton labeled "H" in the right hand array of pushbuttons 9, then each accidental note would be played on the back digital to the immediate right of its designated front digital.

In FIG. 29 the value of the hexatonic musical key signature parameter K is equal to zero, so that the tonal hexachord keynote is played on front digital number 60. The three front digitals 60, 62, 64 play the notes C, D, E and each of their flatted notes is played on the back digital to the immediate left of the designated front digital. The three front digitals 66, 68, 70 play the flats of the notes X, Y, Z and each of their natural notes is played on a back digital to the left of the designated front digital. All the lines of both musical staffs, which are permanently marked on the front digitals of the keyboard, notate the tones do-mi-so of the C major triad, as played on digitals 60, 64, 68. All the spaces between the staff lines notate the tones re-fa-la of the separate D minor triad, as played on front digitals 62, 66, 70. The front digitals 66, 70, 72 play a second major triad, but the hand and fingers cannot be held rigidly in moving to this major triad from the C major triad played by the digitals 60, 64, 68. This is evident from the staff notation, because the second major triad is not discrete—it is notated partly in the spaces and partly on the lines of the musical staffs.

In FIG. 30 the value of K is still zero so that the fingering of the tonal and chromatic hexachords is the same as in FIG. 29, but because the key signature has sharps, all digitals sound tones a semitone higher than they do in FIG. 29. All flatted notes in FIG. 29 become natural notes in FIG. 30 and all natural notes in FIG. 29 become sharps in FIG. 30.

In FIG. 31 the tonal hexachord has moved one front digital to the right along the keyboard. The value of K is equal to 2, so that the tonal hexachord keynote is played on the front digital number 62, and the tonal hexachord is pitched two semitones higher than it is in FIG. 29. However, the *relative* fingering of the digitals is the same as it is in FIGS. 29 and 30. Thus the three front digitals 62, 64, 66 play the notes D, E, X and each of their flatted notes is played on a back digital to the left of the designated front digital. The three front digitals 68, 70, 72 play the flats of the tones Y, Z, C and each of their natural notes is played on a back digital to the immediate left of the designated front digital.

In FIG. 32 the value of K is still 2 but the key signature has sharps. The fingering of the tonal and chromatic hexachords is the same as in FIG. 31, but all digitals sound tones a semitone higher than they do in FIG. 31. With this hexatonic key signature actuation the relative fingering of a musical composition written in any hexachord musical key is always the same as if it were written in the hexachord key of C.

Referring again to FIG. 20, if the pitch numbers are identical to their associated digital numbers, any sequence of seven consecutive pitch numbers from front digitals will increase by the sequence of differences 2-2-2-2-2-2. These pitch numbers are most suitable for playing music written in twelve-tone notation, which does not make use of flat or sharp symbols, or key signatures. Such twelve-tone notation is described by Firestone in U.S. Pat. No. 2,406,946, for use with a keyboard like that shown in FIG. 20. This keyboard arrangement can also be used, with practice, to play music written in either diatonic or hexatonic notation.

Pressing the pushbutton labeled "D" in array 9 selects a group of number changer states based on the diatonic scale. In this case the relationship between the received digital numbers D and the associated pitch numbers P is expressed by equation (2), $$P = D - Q + U \quad (2)$$

where Q is the integral quotient after dividing the quantity D-N-J by seven. J is a diatonic musical key parameter which is an integer in the range $-7$ to $+7$. For all front digitals, U and N are integers that are constant for all values of D and J. For the front digital numbers shown in FIG. 20 the integers N and U are equal to ten and seven respectively. These integers can have either the same or different constant values for the back digitals. The relative fingering of a musical composition will be the same in all diatonic musical keys, provided that the integers N and U are constant for all values of J.

After the pushbutton D in array 9 of FIG. 20 has been pushed to play from the traditional notation, the digital numbers shown in the look-up tables of FIGS. 25 and 26 will be associated with the pitch numbers shown in FIG. 28.

Referring to FIG. 28, the top of this table shows values of the diatonic musical key parameter J running from zero to seven. The first column shows digital numbers D for a group of sixteen consecutive front digitals of the keyboard, and the integral quotients Q for the key of C, obtained by dividing the quantities D-10 by seven. The body of the table shows the associated pitch numbers and their differences from one another. The fixed selection of the eight digitals 60 to 74 sounds all seven modes of the diatonic scale. The digital numbers 60 and 72 do not produce pitch numbers differing by twelve as they do in FIG. 25, but the digital numbers 60 and 74, which differ from each other by fourteen, are associated with the pitch numbers 60 and 72, which differ from each by twelve. Inspection of FIG. 28 for any fixed value of J shows that any two digital numbers D, shown in the first column of the table, which differ from each other by fourteen are associated with two pitch numbers which differ from each other by twelve.

Referring again to FIG. 20, translating apparatus 2 contains a MIDI receiver, a MIDI transmitter, and a number changer, as shown in FIG. 22. FIG. 22 shows the passage of MIDI messages within translating apparatus 2, from receiver 12 to number changer 13, thence (after being changed) to transmitter 14. The number changer is an electronic memory in which the pitch number look-up tables are stored. Details of MIDI receiver 12 are shown in FIG. 23.

Referring to FIG. 23, the pitch numbers from the keyboard enter serially on a 5 pin female DIN connector such as the Switchcraft 57 GB5F, on sockets number 4 and 5 as a 5 mA current loop. To avoid errors, this current passes through an opto-isolator, which may be a Sharp PC-900. It then passes to a Universal Asynchronous Receiver-Transmitter (UART), where it is converted from serial into parallel data. The number changer changes these keyboard digital numbers into pitch numbers and passes them to the transmitter, shown in detail in FIG. 24.

Referring to FIG. 24, the parallel data are converted into serial data by a UART, then amplified by inverters 15 and passed through a 220 ohm resistor to another 5 pin female DIN connector for transmission to the sound generator. The UART may be an Intel 8251A unit. The MIDI receiver and transmitter are described in the MIDI 1.0 detailed specification, published by the International MIDI Association in Los Angeles, Calif.

A MIDI receiver and a MIDI transmitter are also described by Stewart in U.S. Pat. No. 4,777,857 entitled "MIDI Address Converter and Router," having as number changer a circuit which adds the same constant number to all the binary coded numbers it receives from the keyboard digitals. The changed numbers are then transmitted to a sound generator. The present invention differs from that described in U.S. Pat. No. 4,777,857 in that the number changer in this invention is necessarily more complicated. When a keyboard digital is pressed the binary coded number it transmits serially is converted into parallel data by the MIDI receiver. It is then used to address and retrieve one of the numbers stored in a lookup table. The retrieved number is then converted into serial data by the transmitter and sent to the sound generator. Representative lookup tables are shown in FIGS. 25–28 and FIGS. 40, 41.

Electronic memories of size and speed adequate for the present purpose are well known and widely available in the computer and music industries. Suitable for the purpose is the Intel 27C512 Programmable Read Only Memory (EPROM). Information needed for storing 7-bit numbers in this EPROM, and for accessing these numbers, is supplied by the Intel Corporation.

In the present invention a seven bit number is stored at each address of the look-up table, and this stored data is addressed by a 15-bit number which is a product of two 4-bit numbers and a 7-bit number. The two 4-bit numbers are used to select a single state of the translating apparatus from its 256 different states. First a 4-bit number, from pushbutton arrays 8, 9 on the keyboard, is used to select a musical scale. Then a musical key for that scale is selected by another 4-bit number from the front digitals of the keyboard while footswitch 10 is depressed. The remaining seven bits are received from the keyboard as the music is being played, to address the translating apparatus in its single selected state. Each retrieved 7-bit number is converted into serial format by the transmitter and sent to MIDI input terminal 11 on sound generator 3, shown in FIG. 20.

The lookup tables disclosed herein can be stored in general purpose translation apparatus. Detailed instructions for storing such lookup tables in general purpose translation apparatus are provided in my U.S. Pat. No. 4,903,572, which is incorporated herein by reference. That patent, col. 9, line 15 to col. 12, line 11 and FIGS. 13–24, tells in detail how to store the present lookup tables, and how to access these lookup tables in real time, while playing a MIDI keyboard from written music. Using commercial music equipment and the method disclosed in U.S. Pat. No. 4,903,572, any MIDI transmitting keyboard, with or without modification, can be enabled to sound at will either the diatonic scale or any six-tone musical scale on its entire row of front digitals.

OTHER EMBODIMENTS

In addition to the hexachord musical scale, other six-tone musical scales would provide alternatives to the traditional musical notation.

To describe such other six-tone musical scales it is helpful to have symbols to denote the five tones of the twelve tone scale that are not included in the diatonic scale. Robert Stucky and Richard Parncutt have suggested such symbols recently in Vol. 1, No. 5 of *Musical Notation News*, ISSN 0258-963X, a publication of the International Music Notation Modernization Association. The symbols they suggested for these five "chromatic" notes, played on the back digitals of the traditional keyboard, are shown in FIG. 35. As seen in FIG.

35, these symbols are V, W, X, Y, Z, the last five letters of the alphabet. Using these symbols to supplement the notes of the diatonic scale, other six tone musical scales are shown in FIG. 36.

Referring to FIG. 36, the whole tone scale has six uniformly spaced tones labeled C-D-E-X-Y-Z. The majorchord scale is so named because it is made up of the two discrete major triads C-E-G and Z-D-F, one of which can be written on the lines of the musical staffs in all octaves, with the other major triad being written in the spaces of the musical staffs in all octaves. The minorchord scale is so named because it consists of the two discrete minor triads X-A-V and Y-B-W, one of which can be written on all the lines of the musical staffs with the other written in all the spaces of the musical staffs.

The double major and double minor scales each have a pattern of musical intervals that is repeated twice in each octave. The double major scale consists of discrete major triads C-E-G and X-Z-V. The double minor scale consists of the discrete minor triads D-F-A and Y-B-W.

The udsones musical scale has a sequence of musical intervals which has up-down symmetry about two centers of symmetry, each coinciding with a musical interval of one semitone. This scale is composed of the major triad D-X-A and the discrete minor triad Y-B-W. The udsthrees scale also has a sequence of musical intervals which has up-down symmetry about two centers of symmetry, but each of these centers coincides with a musical interval of three semitones. This scale consists of the major triad C-E-G and the discrete minor triad Z-V-F. One of these triads can be written on all the lines of the musical staffs, the other triad being written in all the spaces of the musical staffs.

Referring still to FIG. 36, the six-triad musical scale consists of three pairs of closely spaced tones which are separated from each other by musical intervals of three semitones. The intrapair spacing is a semitone. The notes C, E, Y can occupy all the lines of the musical staffs while the notes W, G, B occupy all the spaces of the staffs. Then each musical staff line will notate the root tone of both a major triad and a minor triad that is contained within the musical scale.

A musical scale containing six or twelve musical tones provides a better basis for musical notation than does a musical scale containing an odd number of tones, because an even number naturally avoids the changing appearance of musical notes as they move from staff lines to staff spaces in adjoining octaves. The discrete consonant musical chords and intervals that are contained in seven six-tone musical scales are listed in FIG. 37.

Referring to FIG. 37, the whole tone scale contains no major or minor triads and it lacks the musical intervals of three, five and seven semitones that are easily sung by children. A dichotomy of the majorchord scale results in the two discrete major triads C-E-G and Z-D-F. Dichotomy of the minorchord scale results in the two discrete minor triads X-A-V and Y-B-W. The pattern of intertone musical intervals for the double major scale is repeated twice in each octave. Dichotomy of this scale gives the two discrete major triads C-E-G and X-Z-V. The pattern of intertone musical intervals for the double minor scale is also repeated twice in each octave. Dichotomy of this scale gives the two discrete minor triads D-F-A and Y-B-W.

The patterns of intertone musical intervals for the UDSONES and UDSTHREES musical scale have up-down symmetry, so that the number of major triads is necessarily equal to the number of minor triads. The UDSONES scale consists of the major triad D-X-A and the discrete minor triad Y-B-W. The UDSTHREES scale consists of the major triad C-E-G and the discrete triad Z-V-F. The six triad scale contains the root tones of three major triads and three minor triads, and it is rich in the musical intervals of three, four, five and seven semitones that are naturally sung even by children. But this scale lacks the musical intervals of two semitones.

FIG. 38 shows how dichotomy of the twelve tone scale can result in nine pairs of the six-tone musical scales listed in FIG. 37. One member of each pair can be played on the front digitals of the musical keyboard shown in FIG. 20, while the other member of the pair is played on the back digitals of the keyboard. Further dichotomy of the six-tone scales results in decomposition of the twelve-tone scale into sets of four triads as shown.

Figure 39:
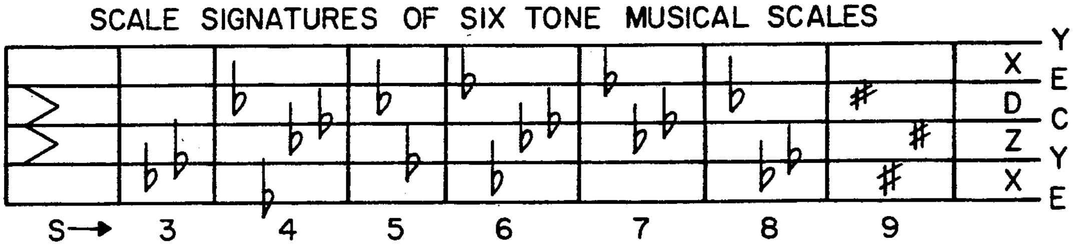
FIG. 39 shows scale signatures of seven six-tone musical scales.

FIG. 39 shows the hexatonic scale signatures for seven of the musical scales listed in FIGS. 36 and 37. The different scales are identified by means of the numbers below each scale signature in FIG. 39, which correspond to the scale numbers in the first column of FIG. 36. As an example, scale signature number three, which flats the X and Y musical tones, produces the majorchord scale listed in FIG. 36. As another example, scale signature number five in FIG. 39, which flats the D and Y musical tones, produces the double major scale listed in FIG. 36.

For these musical scales in different musical keys, each group of flats or sharps shown in FIG. 39 moves rigidly through the staff representing the whole tone scale, as shown for the hexachord scale in FIGS. 11 and 12. In order to automatically actuate the twelve key signatures for each musical scale with the apparatus shown in FIG. 20, the pitch numbers P transmitted by translating apparatus 2 are associated with the received digital numbers D in accordance with the equation (1), where the additive M is equal to $-1$ for the flatted notes and equal to zero for the unflatted notes. U is equal to zero for key signatures of flats and equal to $+1$ for key signatures of sharps. M is a function of remainder R which is the integral remainder after dividing the quantity D-N-K by twelve. For the front digitals shown in FIG. 20 the value of N is zero. K is the hexatonic musical key parameter, which is equal to zero in FIG. 39.

Referring to FIG. 39, for scale 3 (the majorchord scale) the two flats for notes X, Y correspond to values of $M=-1$ for $R=6,8$, while the unflatted notes correspond to $M=0$ for $R=0, 2, 4, 10$. For scale 5 (the double major scale) the two flats for notes D, Y correspond to $M=-1$ for $R=2, 8$, while the unflatted notes correspond to $M=0$ for $R=0, 4, 6, 10$. For scale 8 (the udsthree scale) the three flats for notes D, X, Y correspond to $M=-1$ for $R=2, 6, 8$ while the unflatted notes correspond to $M=0$ for $R=0, 4, 10$. For scale 9 (the six-triad scale) the three sharps for notes D, X, Z correspond to $M=0$ for $R=2, 6, 10$, while the unsharped notes correspond to $M=-1$ for $R=0, 4, 8$. The keyboard positioning of flattened notes for automatic actuation of the key signatures in two examples is shown in FIGS. 33 and 34.

Referring to FIG. 33, for automatic actuation of the majorchord key signature in the key of C, the front digitals having their digital numbers D equal to 66 and 68 sound the X flat and Y flat tones. The pitch numbers for an octave of majorchord tones and all hexatonic key signatures of flats are shown in FIG. 40. Referring to FIG. 40, as the musical key parameter K increases, the keynote pitch number P starts at 60, increases in steps of two with each increase of K up to a value of P=70 for K=10. For each value of K the digital numbers 60 and 72, which differ from each other by 12, are associated with two pitch numbers which also differ from each other by twelve. For example, for K=4 the digital numbers 60 and 72 are associated with the pitch numbers 59 and 71, which differ from each other by 12.

Referring to FIG. 34, for automatic actuation of the double major key signature in the key of C, the front digitals having their digital numbers D equal to 62 and 68 sound the D flat and Y flat tones. The pitch numbers for an octave of double major tones and all hexatonic key signatures of flats are shown in FIG. 41. Referring to FIG. 41, as the musical key parameter K increases, the keynote pitch number P starts at 60, increases in steps of two with each increase of K up to a value of P=70 for K=10. For each value of K the digital numbers 60 and 72, which differ from each other by 12, are associated with two pitch numbers which differ from each other by twelve. For example, for K =4 the digital numbers 60 and 72 are associated with the pitch numbers 59 and 71, which also differ from each other by 12.

The two classes of digitals in the keyboard described hereinbefore need not constitute the entire keyboard, for the keyboard may contain more than two rows of digitals. This invention is also applicable to a single group of digitals such as the row of front keyboard digitals shown in FIG. 20.

I claim:

1. Musical equipment enabling a fixed selection of manually actuated digitals to sound either the diatonic scale or a six-tone musical scale comprising:

a musical instrument having a group of eight manually actuated digitals which are identified by a group of eight different digital numbers, one of the digital numbers to each of the digitals; when each digital is actuated its digital number being transmitted, a sound generator which can receive at least twenty different pitch numbers and which generates a musical tone corresponding to each received pitch number, the sound generator generating a musical interval of N semitones for each pitch number difference of N, a translating apparatus which receives the group of eight different digital numbers from the musical instrument and which can transmit at least twenty different pitch numbers to the sound generator, the translating apparatus having a plurality of states of operation in each of which eight of the pitch numbers are associated with the group of eight received digital numbers, one of the pitch numbers to each of the digital numbers, each of the associated pitch numbers being transmitted to the sound generator, the eight associated pitch numbers constituting a series of integers having a sequence of seven positive differences between consecutive numbers of the series, the plurality of states comprising a first state wherein the sequence of seven differences is 2-2-1-2-2-2-1, a second state wherein each sequence of six differences adds to a total of twelve and the sequence of seven differences adds to a total of thirteen, means for selecting from the plurality of states a single state, whereby the group of eight digitals can sound either the diatonic scale or a six-tone musical scale.

2. The musical equipment of claim 1 in which, in the second state, the sequence of seven differences is 1-2-2-3-2-2-1, whereby the group of eight digitals sounds the hexachord scale.

3. The musical equipment of claim 1 in which, in the second state, the sequence of seven differences is 1-2-3-2-2-2-1, whereby the group of eight digitals sounds the majorchord scale.

4. The musical equipment of claim 1 in which, in the second state, the sequence of seven differences is 1-3-2-1-3-2-1, whereby the group of eight digitals sounds the doublemajor scale.

5. The musical equipment of claim 1 in which, in the second state, the sequence of seven differences is 1-3-1-2-3-2-1, whereby the group of eight digitals sounds the udsthrees scale.

6. The musical equipment of claim 1 in which, in the second state, the sequence of seven differences is 1-3-1-3-1-3-1, whereby the group of eight digitals sounds the sixtriad scale.

7. A process enabling a fixed selection of seven manually actuated digitals to sound any mode of the hexachord scale comprising:

transmitting a unique identifying digital number when each of the seven digitals is manually actuated, receiving the seven different digital numbers and associating them with pitch numbers, the associating process having a plurality of states of operation in each of which seven different pitch numbers are associated with the seven digital numbers, one of the seven pitch numbers to each of the digital numbers, the seven pitch numbers constituting a series of integers having a sequence of six positive differences between consecutive numbers of the series, the plurality of states comprising a first state wherein the sequence of differences is 2-2-1-2-2-3-2, a second state wherein the sequence of differences is 2-1-2-2-3-2-2, a third state wherein the sequence of differences is 1-2-2-3-2-2-1, a fourth state where in the sequence of differences is 2-2-3-2-2-1-2, a fifth state wherein the sequence of differences is 2-3-2-2-1-2-2, a sixth state wherein the sequence of differences is 3-2-2-1-2-2-3, selecting from the plurality of states of operation of the associating process a single state, transmitting the seven pitch numbers associated with the seven digital numbers in that single state, generating a musical tone in correspondence with each of the transmitted pitch numbers, a pitch number difference of N corresponding to a musical interval of N semitones, whereby the fixed selection of seven digitals can sound any mode of the hexachord scale.

* * * * *